UNITED STATES PATENT OFFICE 2,591,589

GAMMA - NITROALKYL - ALPHA,BETA - DICHLORO-GAMMA-CROTONOLACTONES

David T. Mowry, Dayton, Ohio, assignor to Monsanto Chemical Company, St. Louis, Mo., a corporation of Delaware No Drawing. Application July 26, 1950,
Serial No. 176,083

16 Claims. (Cl. 167—33)

This invention relates to lactones and deals more particularly with new derivatives of certain crotonolactones, to a method of preparing the same, and to biological toxicants comprising new compounds herein disclosed.

The new lactones, which I have found to possess high fungicidal, bactericidal and herbicidal efficiency, have the general formula

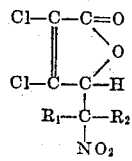

in which $R_1$ and $R_2$ are members of the class consisting of hydrogen and alkyl radicals of from one to 5 carbon atoms and in which the sum total of carbon atoms in $R_1$ and $R_2$ does not exceed 6. As illustrative of compounds having the above general formula may be mentioned $\gamma$-nitromethyl-, $\gamma$-(1-nitroethyl)-, $\gamma$-(2-nitropropyl)-, $\gamma$-(2-nitrobutyl)-, $\gamma$-(3-nitropropyl-, $\gamma$-(2-dimethyl-1-nitroethyl)-, $\gamma$-(2-diethyl-1-nitroethyl)-, or $\gamma$-(5-nitroamyl)-$\alpha,\beta$-dichloro-$\gamma$-crotonolactone. They are readily obtained by the reaction of mucochloric acid with a nitroparaffin of from 1 to 6 carbon atoms and possessing a hydrogen atom on the carbon atom to which the nitro radical is attached, substantially according to the scheme:

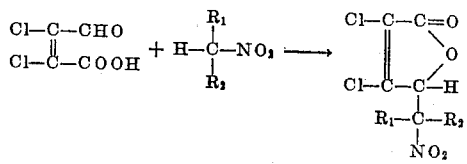

in which $R_1$ and $R_2$ are as defined above.

Nitroparaffins which may be employed with mucochloric acid in the preparation of the present lactones include nitromethane, nitroethane, 1-nitropropane, 2-nitropropane, 2-nitrobutane, 2-nitropentane, and 2-methyl-3-nitrobutane.

The present $\gamma$-nitroalkyl-$\alpha,\beta$-dichloro-$\gamma$-crotonolactones are formed by contacting mucochloric acid with the appropriate nitroparaffin, in the presence of an alkaline condensing agent, at ordinary or increased temperatures. However, in order to avoid side reactions, for example dehalogenation or degradation of the mucochloric acid by the alkaline catalyst, I generally prefer to operate at low or moderate temperatures, say, at temperatures of from minus 10° C. to plus 50° C., depending upon the nature of the individual catalyst employed.

As basic condensing agents there may be employed alkali and alkali metal hydroxides, e. g., sodium, potassium, lithium, calcium or magnesium hydroxide; basically reacting salts such as sodium carbonate, sodium bicarbonate, potassium acetate; alkali or alkali metal alcoholates such as sodium methylate; organic bases such as pyridine, piperidine, triethylamine, etc.

The mixture of mucochloric acid, nitroparaffin and alkaline condensing agent, in the presence or absence of an inert diluent, is generally allowed to stand for a time of, say, from a few minutes to several hours depending upon the nature of the nitroparaffin and catalyst and the temperature employed, and the nitroalkyl dichloro crotonolactone is separated from the reaction product, e. g., by precipitation from a non-solvent such as water, by vacuum distillation, etc. For good yields of the lactone, I find it advantageous to acidify the reaction product before the separating step. The acidifying may be conveniently combined with the separating step by treating the reaction mass with aqueous acid. For example, the crude reaction product may be poured into a cold, aqueous solution of a mineral acid such as hydrochloric acid, an organic acid such as acetic acid, or an acid-reacting salt such as zinc chloride, and the lactone thus precipitated recovered by filtration.

Inasmuch as molecular equivalents of mucochloric acid and the nitroparaffin are involved in the formation of the present lactones, it is advantageous to employ stoichiometric proportions of the two reactants. If desired, however, an excess of either reactant may be employed, since any unreacted material may be separated from the product. In some instances an excess of the nitroparaffin may advantageously be used as a diluent.

Although I find that generally no extraneous solvents or diluents need be employed in the reaction, inert solvents or diluents may be used and are of particular advantage when working with some of the catalysts. With the alkali metal hydroxides, for example, water or an alcohol is preferably used to provide a homogeneous reaction medium. While I prefer to use as a catalyst a material which is soluble in either the reactants or in the diluent, solubility of the catalyst in any of these materials is not a necessary property of the catalyst.

The present lactones are stable, rather high-melting crystalline solids which may be advantageously employed in the chemical and allied industries for a wide variety of purposes. They are of general utility as biological toxicants, particularly as fungicides, bactericides and herbicides; but some of this series of compounds may also be advantageously employed in the formulation of perfumes, as plasticizers or copolymerizable monomers in the synthetic resins and plastics industries, etc.

The invention is further illustrated, but not limited, by the following examples:

Example 1

A solution of 84 g. (0.5 mole) of mucochloric acid and 41 g. (0.55 mole) of nitroethane, dissolved in 200 cc. of methanol, was cooled to 0° C., and 40 g. of sodium hydroxide in 200 cc. of water was slowly added to the solution at a temperature of from 0° C. to 5° C. After standing for 1.5 hours at a temperature of 10° C., the reaction mixture was poured into a mixture of ice and 150 cc. of concentrated hydrochloric acid. A bright blue color developed, and a precipitate formed on standing. The precipitate was filtered off and recrystallized from dilute methanol to give the substantially pure $\gamma$-(1-nitroethyl)-$\alpha,\beta$-dichloro-$\gamma$-crotonolactone, M. P. 121 to 122° C., and analyzing as follows:

| Calcd. for $C_6H_5O_4Cl_2N$ | Found |
|---|---|
| Per Cent C: 31.8 | 32.17 |
| Per Cent H: 2.23 | 2.17 |
| Per Cent N: 6.20 | 5.85 |

The $\gamma$-(1-nitroethyl)-$\alpha,\beta$-dichlorolactone was tested against *Aspergillus niger* using the following testing procedure:

*Preliminary.*—Trommel's Malt Agar was poured into a Petri plate and allowed to harden. A circular section was cut from the center and into this cup was placed 0.1 gram of the lactone. The plate was then sprayed with a fresh aqueous spore suspension of *Aspergillus niger* and incubated at a temperature of 28° C. for five days. Inspection of the incubated plate at the end of that time showed no growth of *Aspergillus niger* within a 5 mm. zone.

*Secondary.*—To 100 cc. of hot Trommel's Malt Agar was added 0.1 gram of the lactone. The agar was then whipped into an emulsion and poured into a cold plate and allowed to harden. 50 cc. of hot agar was added to 50 cc. of the above toxic agar to give a lactone concentration of 0.05 per cent. To 10 cc. of the remaining toxic agar was added 90 cc. of agar to give a concentration of 0.005 per cent. Petri dishes were filled from each of the two mixtures, i. e., that having a lactone concentration of 0.05 per cent and that having an 0.005 per cent concentration. The plates were then sprayed with *Aspergillus niger* and incubated at a temperature of 28° C. for five days. At the end of that time inspection of the plates showed that on plates of both the 0.05 per cent and 0.005 per cent concentration the growth of *Aspergillus niger* was completely inhibited.

Petri plate tests of the lactone against *Pythium*, conducted substantially according to the above procedure, showed no growth of the organism at a lactone concentration of 5 parts per million.

In tests made on spores of the fungus *Sclerotinia fructiola*, 100 parts of $\gamma$-(1-nitroethyl)-$\alpha,\beta$-dichloro-$\gamma$-crotonolactone per million parts of water gave a 100 per cent kill of the fungus.

The bactericidal effect of $\gamma$-(1-nitroethyl)-$\alpha,\beta$-dichloro-$\gamma$-crotonolactone was tested by determining the phenol coefficient against *Staphylococcus aureus* at 20° C., using the Federal Drug Administration procedure. The standard phenol coefficient of the lactone was thereby established as greater than 83.

The herbicidal activity of $\gamma$-(1-nitroethyl)-$\alpha,\beta$-dichloro-$\gamma$-crotonolactone was determined by germination of cucumber seeds for 4 days at a temperature of 76° F. in the presence of aqueous suspensions of the chemical at concentrations of 100 parts per million and 10 parts per million respectively. Seventy-five seeds were used for each test. The results are expressed as per cent length of the primary roots in the presence of the chemical compared with the length of the primary roots of controls which had been germinated in water. The activities of two standard herbicides as obtained by the same test are included for comparison.

| Compound Tested | Per Cent Growth at 100 Parts per Million |
|---|---|
| $\gamma$-(1-Nitroethyl)-$\alpha,\beta$-dichloro-$\gamma$-crotonolactone | 3 |
| 2,4-Dichlorophenoxyacetic acid | 6 |
| Isopropyl carbanilate | 14 |

Example 2

A solution consisting of 42 g. (0.25 mole) of mucochloric acid and 15.2 g. (0.25 mole) of nitromethane in 60 cc. of methanol was treated with 22 g. of sodium hydroxide dissolved in 100 cc. of water. Addition of the alkali was done gradually with stirring and cooling, in order to maintain the temperature of the reaction mixture at from 5° C. to 10° C. The solution turned yellow and become viscous. It was allowed to stand for 30 minutes at a temperature of about 10° C. to 15° C. and then was poured into 1.5 moles of dilute hydrochloric acid in ice.

The almost white precipitate of $\gamma$-nitromethyl-$\alpha,\beta$-dichloro-$\gamma$-crotonolactone thus formed was filtered and dried. It was found to decompose sharply at 84° C.

Petri plate tests of this lactone against *Pythium*, conducted substantially according to the fungicidal testing procedure, described in Example 1, showed no growth of the organism at a lactone concentration of 80 parts per million. Toxicity tests against *Stemphylium sarcinoformae* showed 100 per cent toxicity at a lactone concentration of 50 parts per million parts of water.

Tests of the $\gamma$-nitromethyl-$\alpha,\beta$-dichloro-$\gamma$-crotonolactone against *M. tuberculosis* showed complete control at a 40 parts per million concentration.

Example 3

A solution of 11.1 g. (0.125 mole) of 2-nitropropane and 21 g. (0.125 mole) of mucochloric acid in 30 cc. of methanol was cooled to 0° C. To this there was then slowly added, with stirring, and cooling, a solution of 10.5 g. of sodium hydroxide in 50 cc. of water. The resulting thick yellow solution was then allowed to stand for 2 hours at a temperature of from 10° C. to 15° C. At the end of this time the reaction mixture was poured into a mixture of ice and 60 cc. of concentrated hydrochloric acid. The precipitate which formed was filtered, dried, and recrystallized from 100 cc. of 50 per cent aqueous methanol to give white crystals of the substantially pure $\gamma$-(2-nitropropyl)-$\alpha,\beta$-dichloro-γ-crotonolactone, M. P. 92 to 93° C., and analyzing as follows:

| Calcd. for $C_7H_7O_4NCl_2$ | Found |
|---|---|
| Per Cent C: 35.0 | 35.10 |
| Per Cent H: 2.94 | 2.95 |
| Per Cent N: 5.84 | 5.46 |

Tests of the γ-(2-nitropropyl)-α,β-dichloro-γ-crotonolactone against the fungus *Aspergillus niger*, conducted as described in Example 1, showed complete growth inhibition at 0.005 per cent concentration.

Bactericidal tests of this lactone against *Staphylococcus aureus*, using the standard Federal Drug Administration procedure as in Example 1, gave a phenol coefficient of greater than 83.

Tests of the γ-(2-nitropropyl)-α,β-dichloro-γ-crotonolactone as a herbicide, conducted as in Example 1, showed only a 4 per cent root growth at a concentration of 100 parts per million.

The present γ-nitroalkyl-α,β-dichloro-γ-crotonolactones are thus general biological toxicants.

As fungicides they are highly efficient for preventing and retarding fungus growth on textiles, fur, leather, wood, etc. They may be applied directly to the material which is to be treated, but because the lactones are effective in extremely dilute concentrations, it is preferred to incorporate the present agents with a carrier or diluent.

Fungicidal, bactericidal or herbicidal dusts may be prepared by mixing the nitroalkyl dichloro lactone with dusting materials such as talc, clay, lime, bentonite, pumice, fuller's earth, etc. The present compounds are soluble in the usual organic solvents; and solutions of the lactones in such solvents may be used as sprays.

Suspensions or dispersions of the lactones in a non-solvent such as water are advantageously employed in the treatment of plant foliage, textiles, leather, and other materials with which it is not desirable to employ either a solid carrier or an organic solvent.

What I claim is:

1. Lactones having the general formula

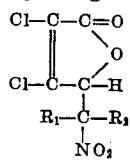

in which $R_1$ and $R_2$ are members of the class consisting of hydrogen and alkyl radicals of from 1 to 5 carbon atoms and in which the sum total of carbon atoms in $R_1$ and $R_2$ does not exceed 6.

2. γ-Nitromethyl-α,β-dichloro-γ-crotonolactone.

3. γ-(1-nitroethyl)-α,β-dichloro-γ-crotonolactone.

4. γ-(2-nitropropyl)-α,β-dichloro-γ-crotonolactone.

5. The process which comprises contacting mucochloric acid, in the presence of a basic condensing agent, with a nitroparaffin having the general formula

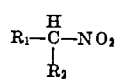

in which $R_1$ and $R_2$ are members of the class consisting of hydrogen and alkyl radicals of from 1 to 5 carbon atoms and in which the sum total of carbon atoms in $R_1$ and $R_2$ does not exceed 6, acidifying the resulting mixture, and recovering from the acidified product a lactone having the general formula

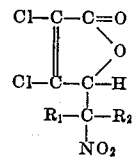

in which $R_1$ and $R_2$ are members of the class consisting of hydrogen and alkyl radicals of from 1 to 5 carbon atoms and in which the sum total of carbon atoms in $R_1$ and $R_2$ does not exceed 6.

6. The process which comprises contacting, at low temperatures and in the presence of an aqueous solution of an alkali metal hydroxide, mucochloric acid with a nitroparaffin having the general formula

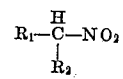

in which $R_1$ and $R_2$ are members of the class consisting of hydrogen and alkyl radicals of from 1 to 5 carbon atoms and in which the sum total of carbon atoms in $R_1$ and $R_2$ does not exceed 6, acidifying the resulting mixture, and recovering from the acidified product a lactone having the general formula

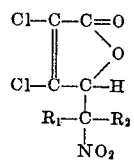

in which $R_1$ and $R_2$ are members of the class consisting of hydrogen and alkyl radicals of from 1 to 5 carbon atoms and in which the sum total of carbon atoms in $R_1$ and $R_2$ does not exceed 6.

7. The process which comprises contacting mucochloric acid with nitroethane at low temperatures and in the presence of an aqueous solution of an alkali metal hydroxide, acidifying the resulting mixture, and recovering γ-(1-nitroethyl)-α,β-dichloro-γ-crotonolactone from the acidified product.

8. The process which comprises contacting mucochloric acid with nitromethane at low temperatures and in the presence of aqueous alkali metal, acidifying the resulting mixture and recovering γ-nitromethyl-α,β-dichloro-γ-crotonolactone from the acidified product.

9. The process which comprises contacting mucochloric acid with 2-nitropropane at low temperatures and in the presence of aqueous alkali metal, acidifying the resulting mixture and recovering γ-(2-nitropropyl)-α,β-dichloro-γ-crotonolactone from the acidified product.

10. A biological toxicant comprising an inert carrier and as an active ingredient, in a quantity which is toxic to living organisms, a lactone having the general formula

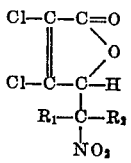

in which $R_1$ and $R_2$ are members of the class consisting of hydrogen and alkyl radicals of from 1 to 5 carbon atoms and in which the sum total of carbon atoms in $R_1$ and $R_2$ does not exceed 6.

11. A fungicidal composition comprising an inert carrier and as the active ingredient, in a quantity which is toxic to fungi, a lactone having the general formula

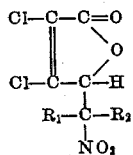

in which $R_1$ and $R_2$ are members of the class consisting of hydrogen and alkyl radicals of from 1 to 5 carbon atoms and in which the sum total of carbon atoms in $R_1$ and $R_2$ does not exceed 6.

12. A bactericidal composition comprising an inert carrier and as the active ingredient, in a quantity which is toxic to bacteria, a lactone having the general formula

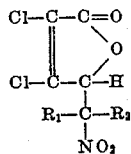

in which $R_1$ and $R_2$ are members of the class consisting of hydrogen and alkyl radicals of from 1 to 5 carbon atoms and in which the sum total of carbon atoms in $R_1$ and $R_2$ does not exceed 6.

13. A herbicidal composition comprising an inert carrier and as the active ingredient, in a quantity which is sufficient to injure living plants, a lactone having the general formula

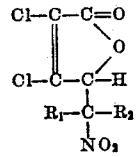

in which $R_1$ and $R_2$ are members of the class consisting of hydrogen and alkyl radicals of from 1 to 5 carbon atoms and in which the sum total of carbon atoms in $R_1$ and $R_2$ does not exceed 6.

14. A biological toxicant comprising an inert carrier and $\gamma$-nitromethyl-$\alpha,\beta$-dichloro-$\gamma$-crotonolactone, as the active ingredient, said lactone being present in a quantity which is toxic to living organisms.

15. A biological toxicant comprising an inert carrier and $\gamma$-(1-nitroethyl)-$\alpha,\beta$-dichloro-$\gamma$-crotonolactone, as the active ingredient, said lactone being present in a quantity which is toxic to living organisms.

16. A biological toxicant comprising an inert carrier and $\gamma$-(2-nitropropyl)-$\alpha,\beta$-dichloro-$\gamma$-crotonolactone, as the active ingredient, said lactone being present in a quantity which is toxic to living organisms.

DAVID T. MOWRY.

REFERENCES CITED

The following references are of record in the file of this patent:

UNITED STATES PATENTS

| Number | Name | Date |
|---|---|---|
| 2,226,183 | Stand | Dec. 24, 1940 |